(12) United States Patent
Huber et al.

(10) Patent No.: US 8,601,938 B2
(45) Date of Patent: Dec. 10, 2013

(54) BABY FORMULA PREPARATION DEVICE

(76) Inventors: John D. Huber, Sherman Oaks, CA (US); Jennifer DiLorenzo, Sherman Oaks, CA (US)

( * ) Notice: Subject to any disclaimer, the term of this patent is extended or adjusted under 35 U.S.C. 154(b) by 1346 days.

(21) Appl. No.: 12/016,086

(22) Filed: Jan. 17, 2008

(65) Prior Publication Data

US 2008/0110935 A1     May 15, 2008

Related U.S. Application Data

(63) Continuation-in-part of application No. 11/109,107, filed on Apr. 18, 2005, now abandoned.

(60) Provisional application No. 60/564,103, filed on Apr. 20, 2004.

(51) Int. Cl.
*A47J 31/00*      (2006.01)

(52) U.S. Cl.
USPC .............. 99/289 R; 99/290; 99/305; 99/323.3

(58) Field of Classification Search
USPC .............. 99/279, 289 R, 290, 304, 305, 307, 99/323.3; 141/100, 82; 222/55, 58, 77, 222/146.5, 146.2
See application file for complete search history.

(56) References Cited

U.S. PATENT DOCUMENTS

| 3,352,460 | A | | 11/1967 | Herring |
| 4,139,125 | A | | 2/1979 | Arzberger et al. |
| 4,357,861 | A | | 11/1982 | Di Girolamo |
| 4,595,131 | A | | 6/1986 | Ruskin et al. |
| 5,241,898 | A | | 9/1993 | Newnan |
| 5,345,041 | A | * | 9/1994 | Swanson ........................ 177/105 |
| 5,397,031 | A | | 3/1995 | Jensen |
| 5,570,816 | A | | 11/1996 | LaBarbera, Jr. |
| 5,671,325 | A | | 9/1997 | Roberson |
| 5,797,313 | A | | 8/1998 | Rothley |
| 5,927,553 | A | | 7/1999 | Ford |
| 6,118,933 | A | | 9/2000 | Roberson |
| 6,164,189 | A | * | 12/2000 | Anson ............................. 99/281 |
| 6,170,386 | B1 | | 1/2001 | Paul |
| 6,173,117 | B1 | * | 1/2001 | Clubb ............................ 392/442 |
| 6,253,028 | B1 | | 6/2001 | Roberson |
| 6,411,777 | B2 | | 6/2002 | Roberson |
| 6,766,106 | B2 | | 7/2004 | Roberson |
| 6,837,397 | B2 | | 1/2005 | Lassota |
| 7,021,197 | B2 | | 4/2006 | Chen et al. |
| 7,047,870 | B2 | | 5/2006 | Gantt et al. |
| 7,316,249 | B2 | | 1/2008 | Cheong |
| 2001/0012448 | A1 | | 8/2001 | Roberson |
| 2002/0127005 | A1 | | 9/2002 | Roberson |
| 2006/0150821 | A1 | * | 7/2006 | Paul et al. ....................... 99/279 |
| 2006/0278093 | A1 | * | 12/2006 | Biderman et al. ............... 99/282 |

* cited by examiner

*Primary Examiner* — Reginald L Alexander
(74) *Attorney, Agent, or Firm* — Kelly & Kelley, LLP

(57) ABSTRACT

The baby formula preparation device includes a powder hopper and a distributor operably associated with the powder hopper for dispensing powdered baby formula into a baby bottle. The device also includes a water dispensing system having a water storage tank and a water heater that dispenses heated water into the baby bottle. A load cell measures the weight of the bottle and a controller coupled to the load cell regulates the quantity by weight of heated water and powdered baby formula dispensed into the baby bottle.

7 Claims, 9 Drawing Sheets

BABY FORMULA PREPARATION DEVICE

BACKGROUND OF THE INVENTION

The present invention generally relates to a baby formula preparation device. More particularly, the present invention relates to a baby formula preparation device capable of automatically dispensing any one of a plurality of powdered baby formulae.

New parents must take on new responsibilities and expenses after a child is born. These responsibilities and expenses often did not exist before the child was born. One particularly important responsibility is maintaining a regular feeding schedule. Feeding schedules for babies typically ranges from intervals of a minimum of three hours to a maximum of about four hours. The majority of babies naturally adapt to the feeding schedule within a few weeks. Naturally, the feeding schedule intervals may shift depending on the schedule most convenient for the parents and the baby. Nighttime feeding is mandatory for the baby regardless of the feeding schedule.

Many parents endeavor to lower expenses by purchasing less expensive powdered baby formula versus more expensive pre-mixed liquid baby formula. The main problem with powdered baby formula is that there are many inconvenient and time-consuming procedures required to manually prepare the formula for consumption. Powdered baby formula requires many preparation steps and is particularly painstaking when compared to pre-mixed liquid baby formula. Although, pre-mixed liquid baby formula even requires transferring the baby formula to a bottle and warming the liquid to a pre-determined temperature before serving. Listening to the baby cry during formula preparation, whether powdered baby formula or pre-mixed liquid baby formula, is often frustrating, especially for new parents. Late-night and early morning feeding especially exacerbates the preparation, particularly when the baby is crying.

Thus, late-night or early morning feedings are ideally quick and easy. Reducing the preparation time increases the potential amount of sleep parents receive as a result of expedient feeding. Ideally, the sleep schedule of the parents is not adversely impacted by the feeding schedule of the baby. Babies are also more inclined to return to sleep when receiving baby formula in a timely manner. Otherwise, the baby may become agitated from hunger when the baby formula is not immediately forthcoming. Consequently, the baby may not return to sleep as quickly after feeding is complete.

Preparation time may be shortened by microwaving either mixed powdered baby formula or pre-mixed liquid baby formula. But, many essential vitamins and minerals are removed from the baby formula during the microwaving process. Additionally, microwaving might generate hot spots within the bottle that could harm the baby during feeding. An additional inconvenience is that the microwave is usually not located near where the baby feeding occurs. Parents must leave the baby alone and go to the kitchen to prepare the baby formula for consumption.

U.S. Publication No. 2005/230,343 discloses a baby formula preparation device that may be conveniently located crib side and is capable of automatically preparing liquid baby formula from powdered baby formula and water. The device has a motor-driven auger in a hopper for dispensing a desired quantity of powdered baby formula from the hopper. A mixing wheel in the hopper rotates and stirs the formula as the auger is rotated. Water is gravity fed from a water storage tank to a reservoir where it is heated to a desired temperature. A discharge nozzle receives and mixes the heated water and a corresponding amount of powdered baby formula for delivery to a baby bottle. While this baby formula preparation device is capable of automatically preparing liquid baby formula from powdered baby formula and heated water, the device is unable to accurately measure the amount of baby formula mixed and dispensed into the baby bottle. This is particularly disadvantageous for changing between different types or serving sizes of powdered baby formula. The quantity of powdered baby formula required to make a single serving size of liquid baby formula varies among manufacturers and types of baby formulae. Moreover, the auger is unable to entirely dispense the powdered baby formula from within the hopper. Hence, the hopper must be cleaned when the user decides to switch between powdered baby formula brands or types.

Accordingly, there is a need for a baby formula preparation device that can automatically prepare powdered baby formula for consumption based on the type of baby formula and desired serving size. Such a baby formula preparation device should include a distribution unit for dispensing loaded powdered baby formula into a baby bottle, should include a selectively operable water heater, should include a water dispensing system, and should include a controller for regulating the amount by weight of powdered baby formula and water dispensed into the baby bottle measured by a corresponding load cell. Furthermore, the baby formula preparation device should be locatable conveniently next to the baby crib and should be capable of being activated remotely. The present invention fulfills these needs and provides other related advantages.

SUMMARY OF THE INVENTION

The baby formula preparation device of the present invention includes a powder hopper and a distributor operably associated with the hopper for loading powdered baby formula from the hopper into a baby bottle. The distributor is mechanically powered by a motor-driven auger. The baby formula preparation device further includes a water storage tank and a water heater for dispensing heated water into the baby bottle. A load cell measures the weight of the bottle and a controller coupled to the load cell regulates the quantity of powdered baby formula and heated water dispensed into the bottle based upon sensed loading by the load cell.

A controller regulates the operation of the baby formula preparation device. Specifically, the controller is coupled to the distributor and regulates the quantity of powdered baby formula loaded into the bottle based upon sensed measurements from the load cell. The controller receives information regarding the quantity by weight of powdered baby formula and heated water required for preparing a serving of baby formula from the measurements taken by the load cell. The controller also regulates a gravity feed water system that draws water from a storage tank, through the water heater and out a nozzle. The water temperature exiting the water heater is measured by a temperature sensor electronically coupled to the controller. The baby formula preparation device further includes a means for regulating the water temperature exiting the nozzle. Preferably, the heated water is heated to approximately body temperature before exiting the nozzle.

In another aspect of the present invention, the powdered baby formula hopper and water storage tank of the baby formula preparation device are removable to better facilitate cleaning or washing. Additionally, a remote transmitter is integrated into the device and is capable of remotely activating the baby formula preparation device. Preferably, the remote transmitter includes a radio frequency or infrared transmitter. The baby formula preparation device may also include a switch capable of proportionally changing the number of servings dispensed into the baby bottle. To better facilitate quick and easy baby formula preparation, the baby bottle should have a predetermined tare weight.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
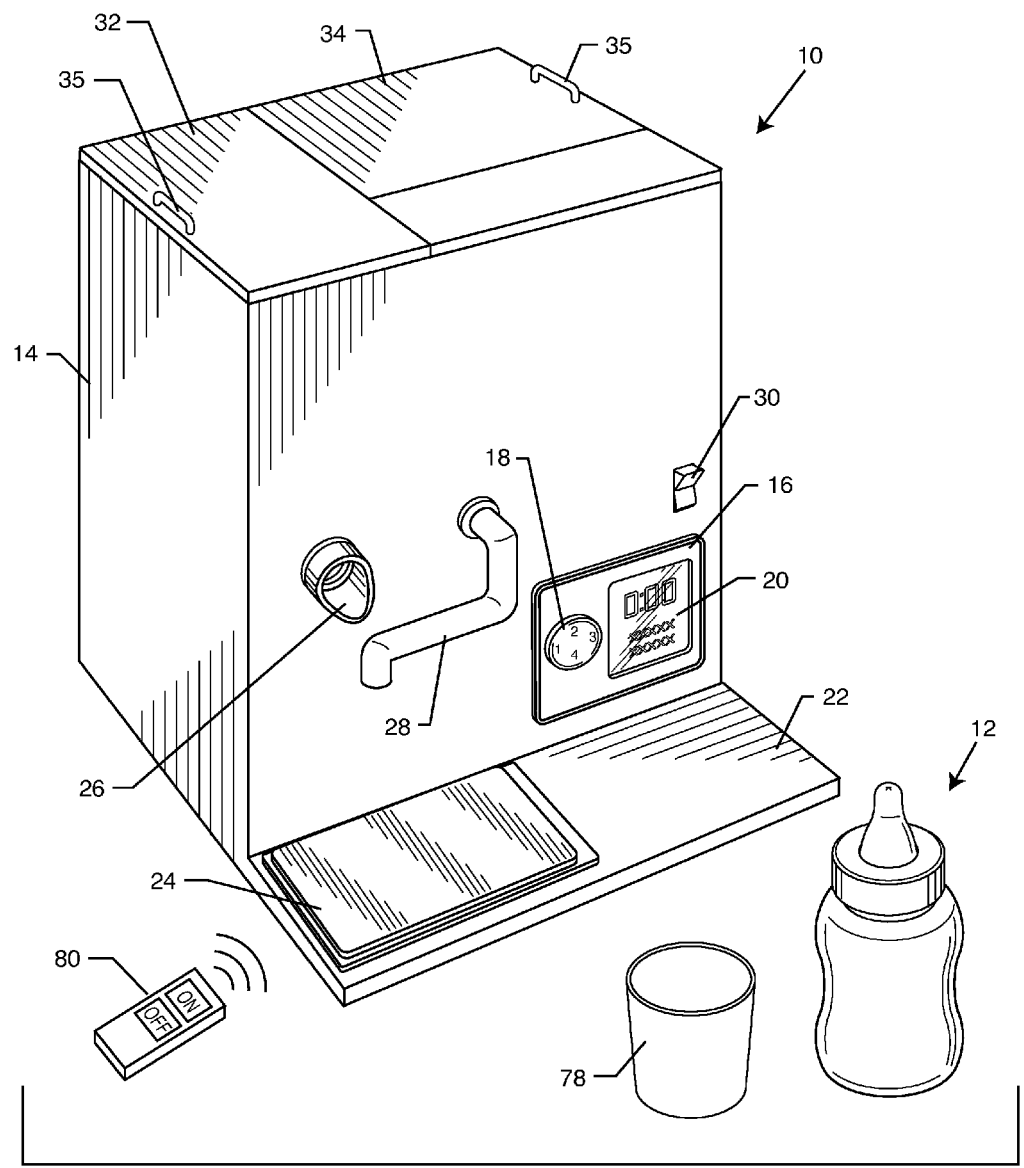
FIG. 1 is a perspective view of the baby formula preparation device, in accordance with the present invention.

As shown in the accompanying drawings for purposes of illustration, the present invention for a baby formula preparation device is referred to generally by the reference number 10. In the representative figures in the specification, FIG. 1 illustrates the baby formula preparation device 10 for use in conjunction with a baby bottle 12. In general, the baby formula preparation device 10 is used to automatically dispense water and powdered baby formula into the baby bottle 12 to prepare a predetermined serving size of liquid baby formula. Water and powdered baby formula are dispensed into the baby bottle 12 in a matter of a few seconds after activating the baby formula preparation device 10. Thereafter the water and powdered baby formula are shaken together within the baby bottle 12 to create a serving of liquid baby formula. The liquid baby formula is then ready to feed to a baby. Those skilled in the art will appreciate that the baby formula preparation device 10 of the present invention allows a parent or caretaker to timely mix baby formula and assemble the baby bottle 12 with one hand while simultaneously holding the baby. In a preferred embodiment, the baby formula preparation device 10 is sized and configured for placement in a bedroom, such as next to a baby crib, on a changing table, dresser or end table.

As shown in FIG. 1, the baby formula preparation device 10 includes a set of outer walls that define a housing 14. The housing 14 encases the internal components of the baby formula preparation device 10 shown in FIG. 2. The housing 14 is preferably durable, yet light-weight and may comprise sheet metal or more preferably plastic. A display screen 16 is mounted to the exterior of the housing 14 and provides a plurality of information regarding the current settings of the baby formula preparation device 10. The display screen 16 may include a serving size dial 18 or an interactive touch screen 20. Users may use the touch screen 20 to specifically configure any of the settings in the baby formula preparation device according to the type and quantity of baby formula being prepared. A base 22 of the baby formula preparation device 10 includes a load cell 24 or other comparable scale for measuring the quantity by weight of powdered baby formula and water dispensed into the baby bottle 12. Accordingly, a spout 26 and a nozzle 28 extend out from the housing 14 to dispense powdered baby formula and water, respectively, into the baby bottle 12 as described herein. An external heater switch 30 enables users to selectively preheat dispensed water.

Figure 2:
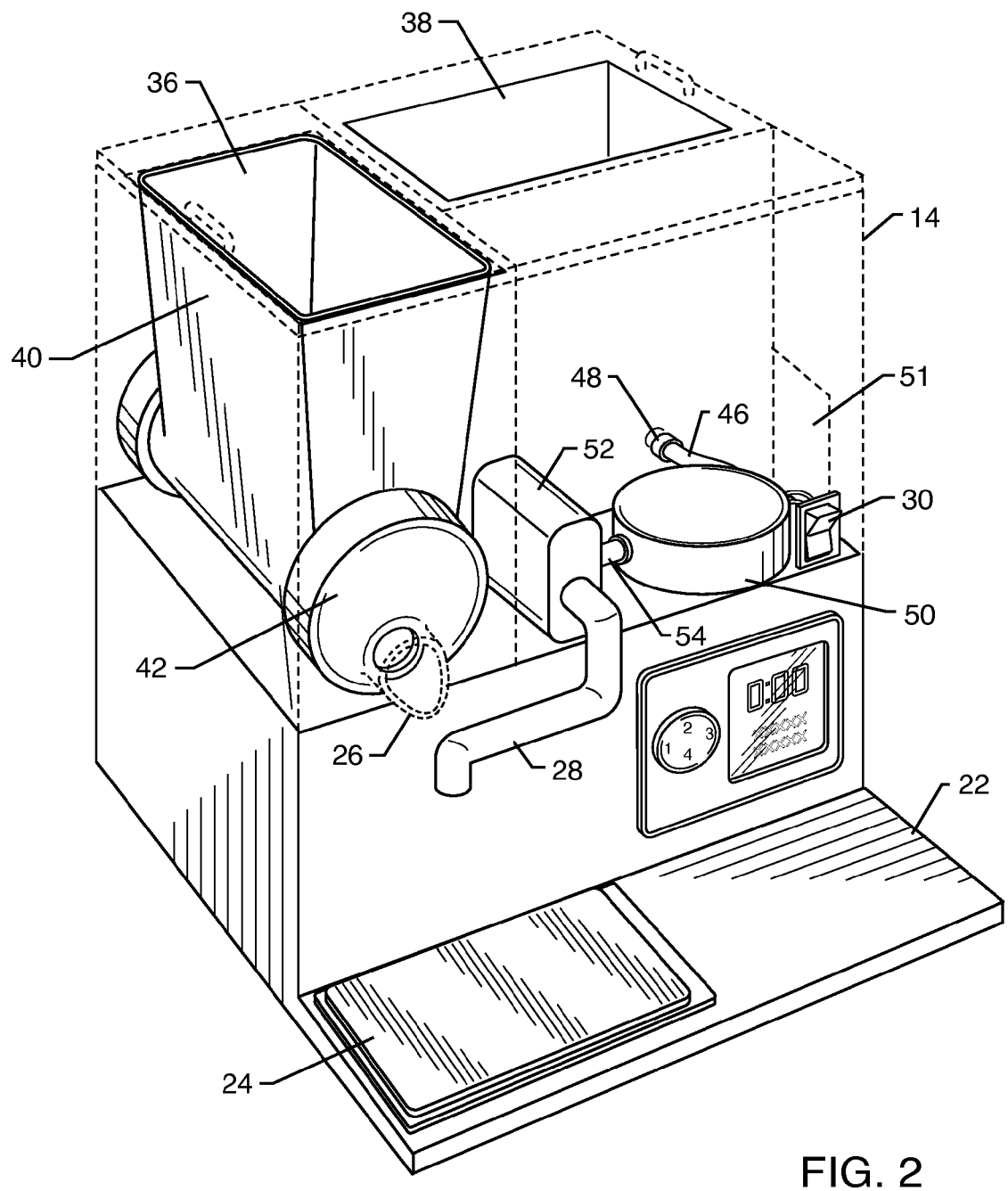
FIG. 2 is a perspective view of the baby formula preparation device of FIG. 1, illustrating the internal components.

FIG. 1 also illustrates a pair of lids 32, 34 each having a handle 35 for accessing a powdered baby formula hopper 36 and a water storage tank 38 (both shown in FIG. 2). The lids 32, 34 pivotally connect to a portion of the housing 14 with a set of hinges (not shown). The lids 32, 34 open by grasping the handle 35 and pivoting each respective lid 32, 34 about the hinges. In a preferred embodiment shown in FIG. 1, the lids 32, 34 rotate toward one another. This prevents both the lids 32, 34 from being open at the same time. Preventing the lids 32, 34 from simultaneously opening helps prevent accidental contamination of either the powdered baby formula hopper 36 or the water storage tank 38 resulting from accidental spillage during loading.

Figure 3:
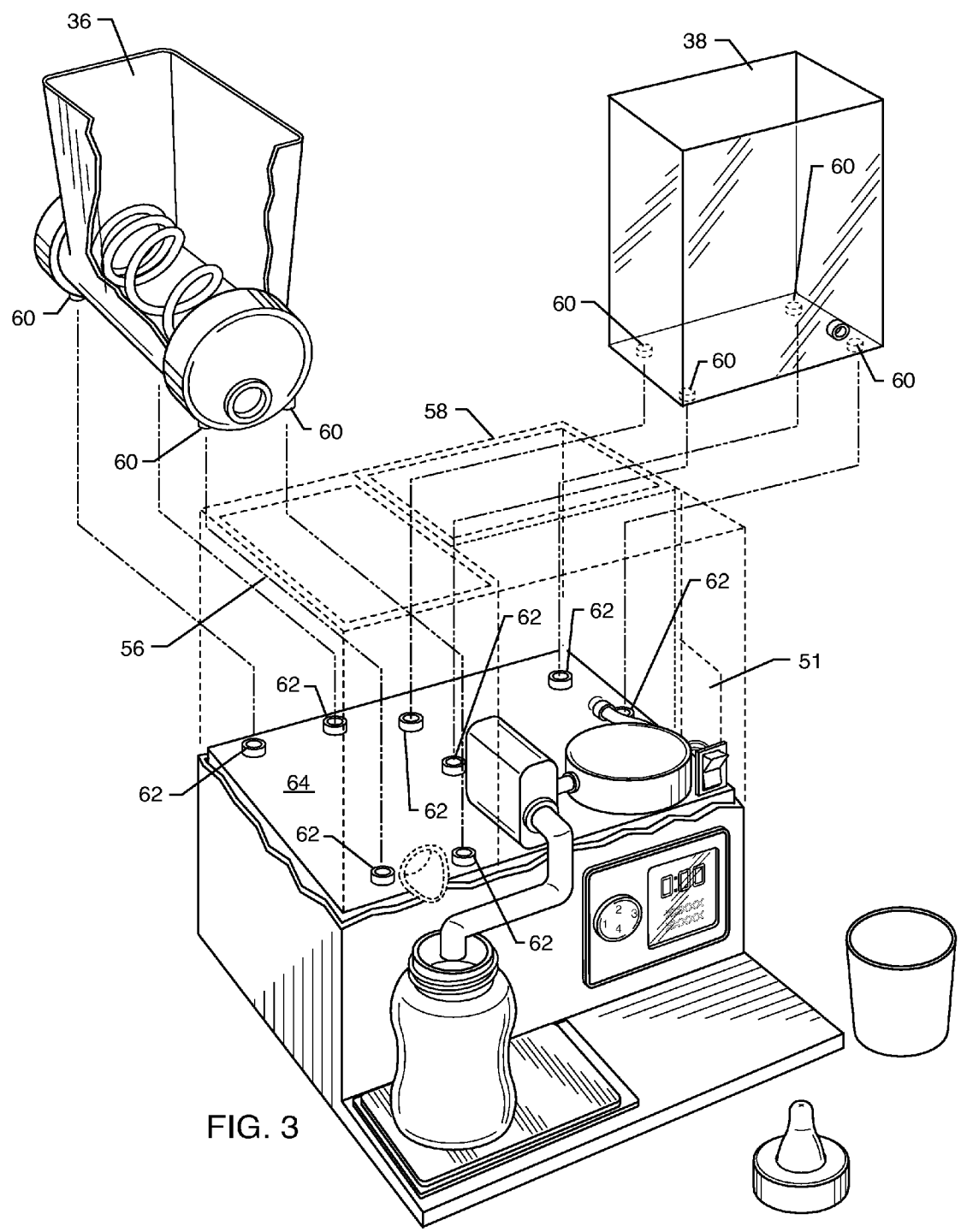
FIG. 3 is an exploded perspective view of the baby formula preparation device of FIG. 1, illustrating removal of a powdered baby formula hopper and a water storage tank.
Figure 8:
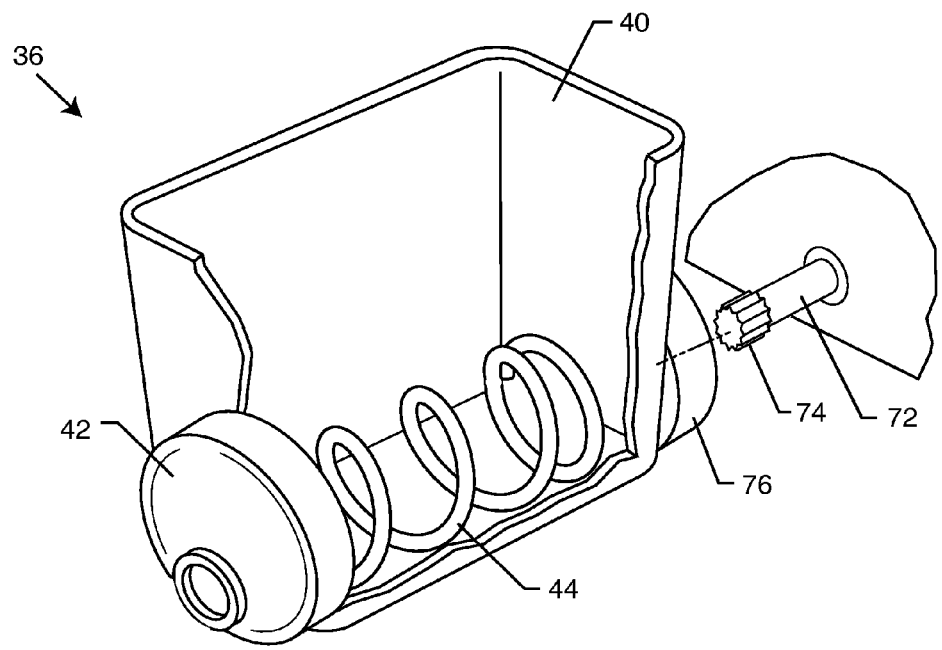
FIG. 8 is a partially sectioned perspective view of the hopper, illustrating interconnection with a drive motor.
Figure 10:
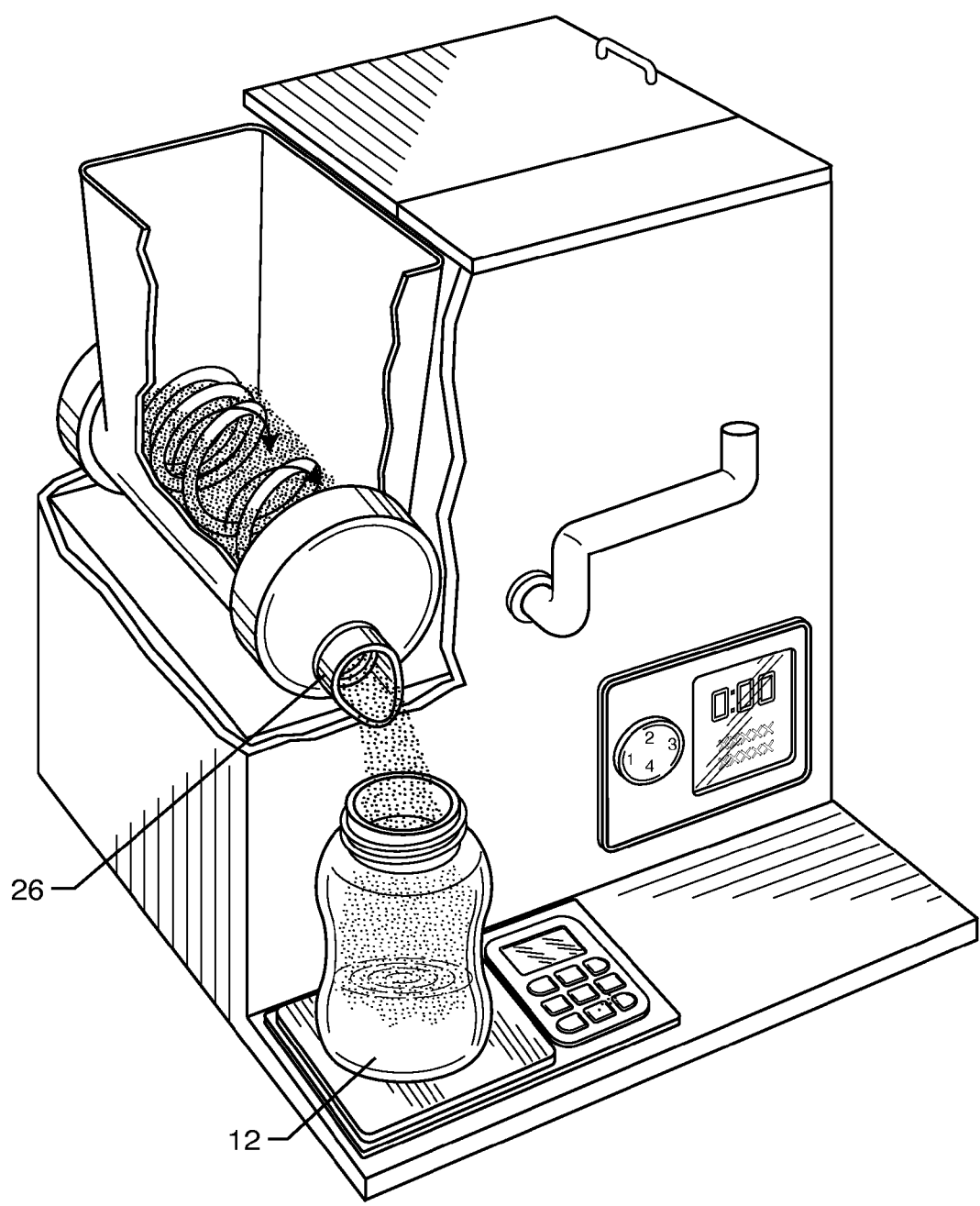
FIG. 10 is a partially sectioned perspective view of the baby formula preparation device of the present invention, illustrating dispensing powdered baby formula into the baby bottle.

FIG. 2 best illustrates the interconnection of the internal components of the baby formula preparation device 10 protected by the outer housing 14. As shown, the powdered baby formula hopper 36 includes a generally tapered upper trough 40 that angles inwardly into a cylinder 42. As depicted in FIGS. 3 and 8, the walls of the trough 40 are nearly vertical such that the bottoms of the walls of the trough 40 are aligned with the walls of the cylinder 42 and auger 44 contained therein. The trough 40 helps channel powdered baby formula toward the bottom of the cylinder 42 to contact an auger 44 disposed within the cylinder 42, as shown in FIGS. 3 and 10. The powdered baby formula hopper 36 dispenses powdered baby formula via the auger 44, through the housing 14 and out the spout 26, as described below.

As shown in FIG. 2, the water storage tank 38 is coupled to a conduit 46 via a valve 48 for connection to a water heater 50. The valve 48, such as a Cooper valve, prevents water from flowing out of the water storage tank 38 when the conduit 46 is not connected thereto. Only after the valve 48 engages the conduit 46 does the valve 48 open to allow the passage of water therein. The connection between the water storage tank 38 and the conduit 46 may be accessed via a side panel 51. The valve 48 is particularly useful to stop water flow when removing the water storage tank 38 from within the housing 14 for cleaning, etc. The conduit 46 couples the water storage tank 38 to the water heater 50. The water heater 50 is, in turn, coupled to a water dispenser 52 via a second conduit 54 for delivery to the baby bottle 12 via the nozzle 28.

As best shown in the exploded perspective view in FIG. 3, both the powdered baby formula hopper 36 and the water storage tank 38 removably reside within a corresponding pair of storage containers 56, 58 (in phantom) formed in the baby formula preparation device 10. In a preferred embodiment, the powdered baby formula hopper 36 slides into the storage container 56 and the water storage tank 38 may be placed on the platform 64. In this embodiment, the powdered baby formula hopper 36 simply slides into place for engagement with the motor mechanism shown in FIG. 8. Likewise, the water storage tank 38 may just slide into place for connection to the valve 48. The water storage tank 38 may engage a poppet or check valve to facilitate fluid coupling with the conduit 46. In an alternative embodiment, the powdered baby formula hopper 36 and the water storage tank 38 removably connect to the platform 64 via interconnection of a set of connectors 60 with a set of receptors 62 located along the internal platform 64 of the baby formula preparation device 10. The connectors 60 preferably snap into or otherwise securely engage the set of receptors 62 to ensure stable and secure placement of the powdered baby formula hopper 36 and the water storage tank 38 within the corresponding containers 56, 58.

The baby formula preparation device 10 is initially set up in a factory or by an end user by calibrating a programmable electronic controller (not shown) that regulates the operations disclosed herein. The tare weight of the baby bottle 12 is calibrated by placing an empty baby bottle 12 on the load cell 24 and pushing a calibration button located on the touch screen 20. The controller card is preprogrammed with a set of instructions corresponding to a plurality of different types of baby formula. Alternatively, the controller card may be manually calibrated for new types of powdered baby formula. Powdered baby formula calibration is conducted by adding two ounces of water to the tared baby bottle 12 and again pushing the calibration button on the touch screen 20. Calibrating the water weight for one serving must only be conducted once regardless whether the user changes baby bottles or the type of baby formula. Thereafter, one serving of powdered baby formula is added to the baby bottle 12 using the measuring cup provided by the powdered baby formula manufacturer, followed by pushing the calibration button again. The weight information measured by the load cell 24 is then stored in the controller card and may be later used to prepare the desired serving of that specific powdered baby formula. This stored information is retrievable at a later date in the event that the user changes among different types of powdered baby formula. The process of calibrating the powdered baby formula is the only step that must be repeated for each new baby formula used with the present invention and not stored or preprogrammed into the controller. The controller regulates the amount by weight of powdered baby formula and water dispensed into the baby bottle 12 from measurements taken by the load cell 24.

Figure 4:
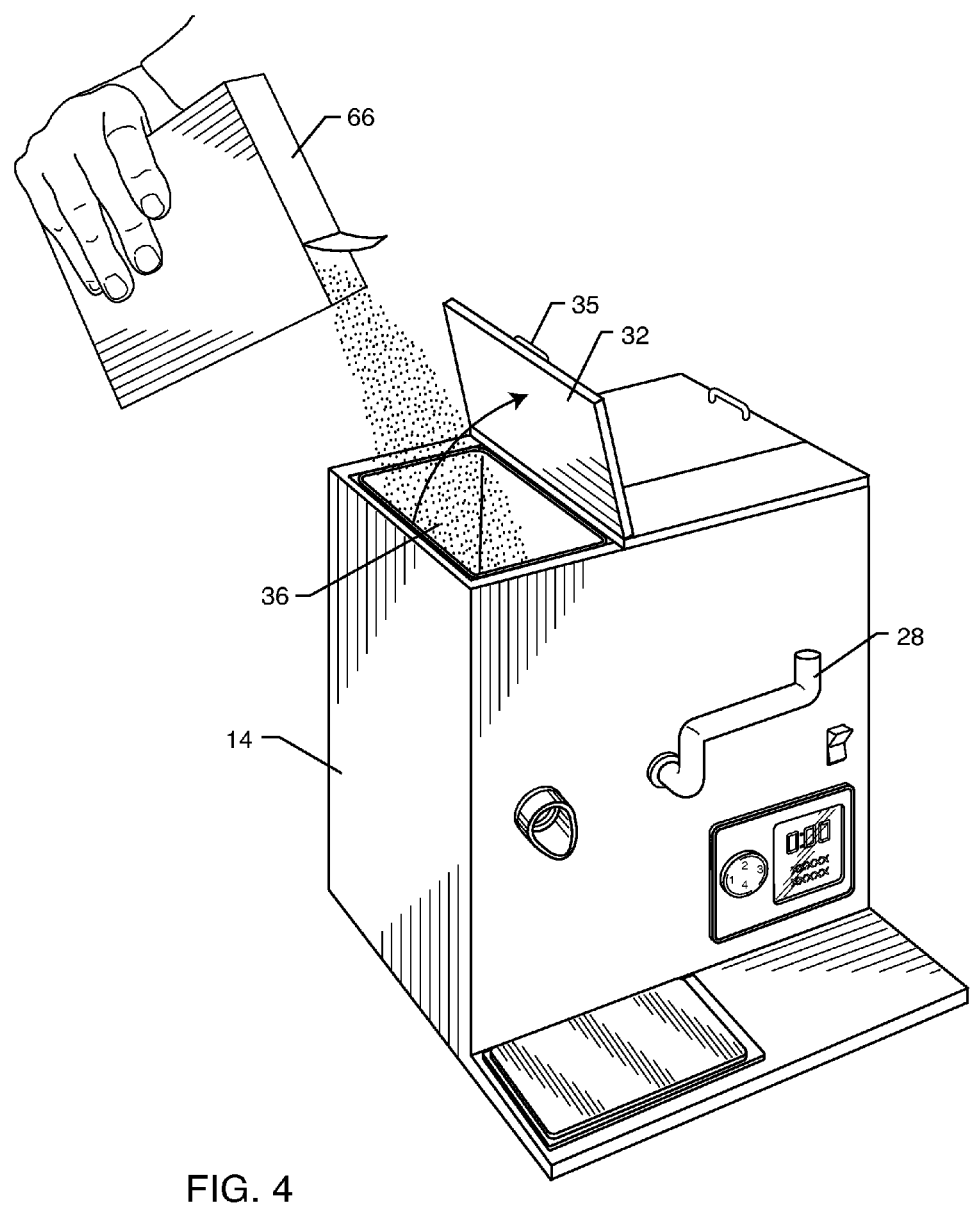
FIG. 4 is a perspective view illustrating pouring baby formula into the hopper, in accordance with the present invention.
Figure 5:
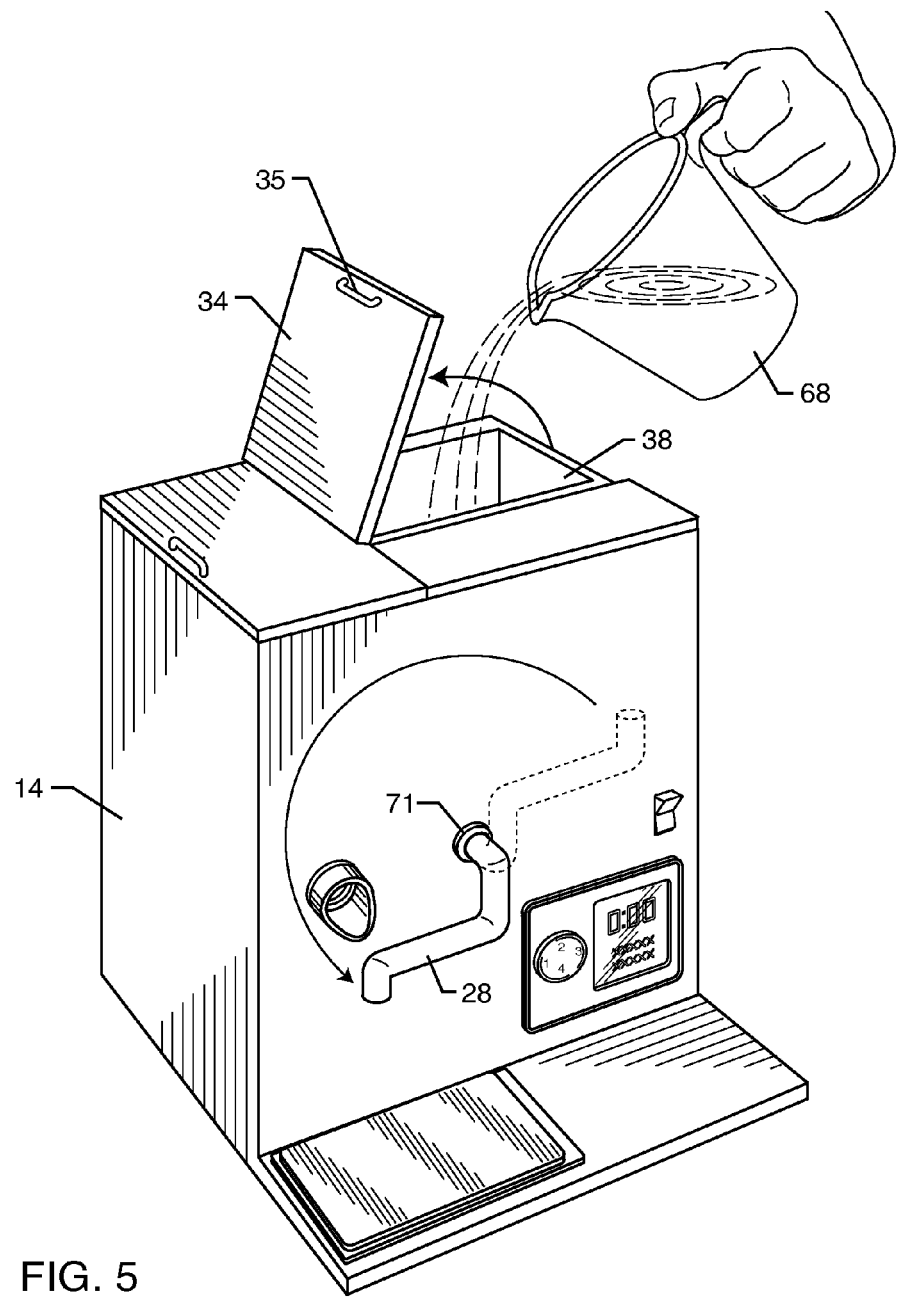
FIG. 5 is a perspective view illustrating pouring water into the water storage tank, in accordance with the present invention.

It is preferred in the present invention that the powdered baby formula hopper 36 and the water storage tank 38 be filled while secured within the containers 56, 58. Doing so further facilitates crib side operation. FIG. 4 specifically illustrates the addition of powdered baby formula from a box of powdered baby formula 66. The user opens the lid 32 by grasping the handle 35 and rotating the lid 32 along the directional arrow and about the hinges. The user is then able to add baby formula (200) to the baby formula preparation device 10 of the present invention in accordance with the first step of preparing liquid baby formula according to the flowchart shown in FIG. 11. Access to the powdered baby formula hopper 36 is then closed by rotating the lid 32 in the opposite direction. Similarly, as shown in FIG. 5, water is added (200) to the water storage tank 38 by grasping the handle 35 and rotating the lid 34 along the directional arrow shown therein. The user then pours a container of water 68 into the interior chamber of the water storage tank 38. The lid 34 is closed once the water storage tank 38 is full of water. Either the lids 32, 34 may include a latch or other attachment mechanism that securely closes the lids 32, 34 to the housing 14. The powdered baby formula hopper 36 and the water storage tank 38 should both be able to retain enough ingredients to make at least a standard can of powdered baby formula. Preferably the powdered baby formula hopper 36 and the water storage tank 38 can accommodate enough ingredients for several cans of powdered baby formula.

The powdered baby formula hopper 36 and the water storage tank 38 are both removable when either of the lids 32, 34 are open. Removal of the powdered baby formula hopper 36 or the water storage tank 38 simply requires providing enough upward force to disconnect the connectors 60 from the receptors 62. Once removed, the powdered baby formula hopper 36 and the water storage tank 38 may be cleaned. The hopper 36 and the tank 38 may also be filled at another location, such as by a sink, to prevent any adverse impact to surrounding furniture resulting from spillage. Although it is preferred that the powdered baby formula hopper 36 and the water storage tank 38 be filled in accordance with FIGS. 4 and 5, respectively.

Figure 11:
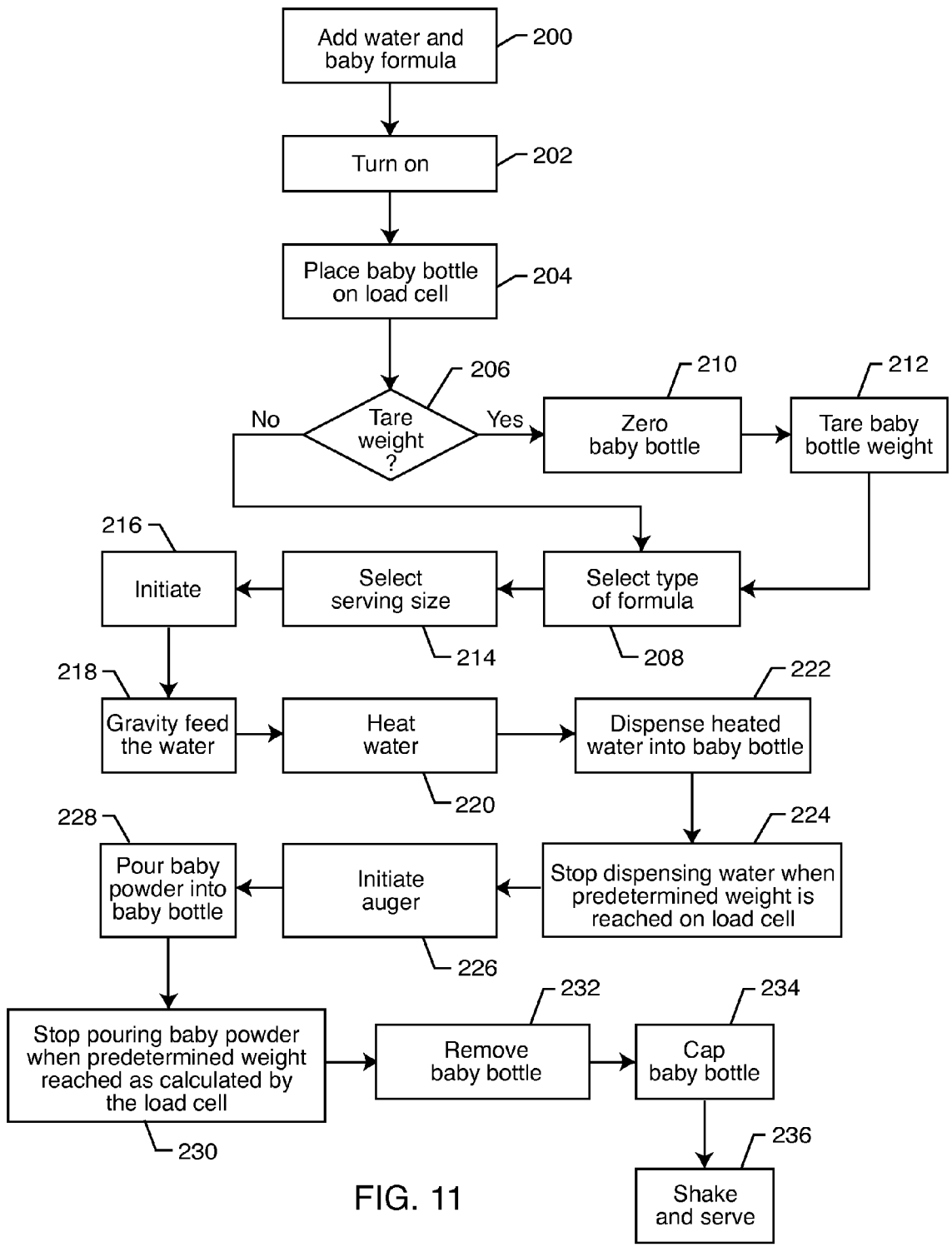
FIG. 11 is a flowchart illustrating the operational procedure for preparing powdered baby formula in accordance with the present invention.

As further shown in the flowchart of FIG. 11, after the step of adding water and baby formula (200), activation of the baby formula preparation device 10 requires turning the device on (202). The baby formula preparation device 10 may be turned on (202) manually by a mechanical switch, via the touch screen 20 or otherwise activated remotely by an infrared or radio frequency transmitter 80. Once the device is turned on (202), the user places the baby bottle 12 on the load cell (204) to determine if the baby bottle 12 is the standard tare weight (206). Preferably the baby bottle 12 has a standard and predetermined weight such that the load cell 24 reads a zero load when the baby bottle 12 is placed thereon. Placing a standard baby bottle 12 on the load cell (204) does not require calibration and the user may immediately move to the step of selecting the type of baby formula (208). Otherwise, the user must tare the weight of a non-standard baby bottle 12. Zeroing the weight of the baby bottle (210) may encompass pressing a button on the touch screen 20 or otherwise sending a command the to the device controller to tare the weight of the baby bottle (212).

Once the baby bottle 12 has been zeroed on the load cell 24, the user selects the baby formula type (208). The display screen 16 may convey to the user a set of selectable preprogrammed powdered baby formula brands usable with the present invention. A person of ordinary skill in the art will readily recognize that the device of the present invention is capable of being used with a wide variety of powdered baby formula brands, types, compositions, and formulas. New powdered baby formula may also be calibrated and programmed into the controller via the touch screen 20, as described above. This ensures that the baby formula preparation device 10 of the present invention may be used with newly developed powdered baby formulae. It is important that the user be able to select a type of baby formula (208) as differently manufactured powdered baby formula compositions require varying amounts of ingredients. The amount of powdered baby formula is measured by weight to correspond with each type of powdered baby formula. The baby formula preparation device 10 of the present invention eliminates the need to constantly measure out the necessary amount of baby formula required to prepare a serving of liquid baby formula.

Accordingly, the user then selects the desired serving size (214). The serving size may be selected (214) via the serving size dial 18 (FIG. 1). The serving size dial 18 includes serving size multiples of 1×, 2×, 3× and 4×, but may contain more (e.g. >4×) or less (e.g. <1×) depending on the needs of the user. The controller automatically changes the quantity of powdered baby formula and water added to the baby bottle 12 as described below. Hence, selection of the type of baby formula (208) enables the controller to dispense a specific quantity of powdered baby formula and water into the baby bottle 12 in order to prepare the desired number of servings.

For example, the user may use a standard baby bottle 12 having a tare weight of 37 grams. Placing the baby bottle 12 on the load cell (204) would read zero grams on the load cell 24. The controller therefore does not require the user to tare the weight (206) of the baby bottle 12. A single serving size (1×) of 1 ounce ("oz.") of powdered baby formula for this hypothetical manufacturer may be 20 grams of water and 10 grams of powdered baby formula. Accordingly, to make 2 oz. of baby formula (2×), the controller would need to dispense 40 grams of water and 20 grams of powdered baby formula. A triple serving (3×) would require 60 grams of water and 30 grams of powdered baby formula. Accordingly, each multiple serving of liquid baby formula requires an additional 20 grams of water and 10 grams of powdered baby formula. The controller may also prepare intermediate multiples (e.g. a 1.5× serving requires 30 grams of water and 15 grams of powdered baby formula). These quantities are all automatically measured by the controller via the load cell 24 readings during the dispensing process.

Figure 6:
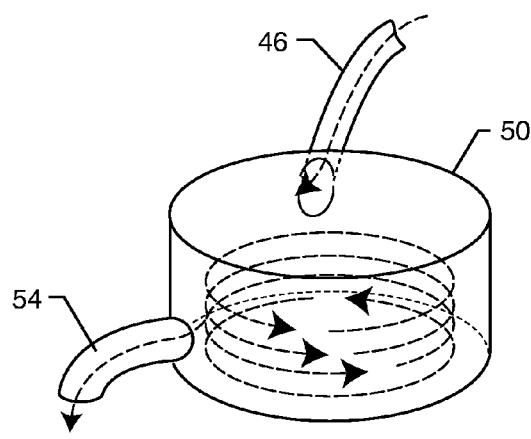
FIG. 6 is an internal perspective view of a water heater, illustrating water flow therein.
Figure 7:
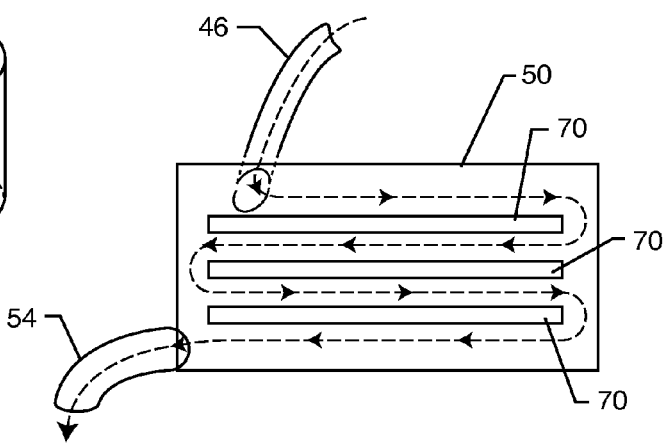
FIG. 7 is a side view of the water heater of FIG. 6, illustrating water flow through multiple heating levels therein.
Figure 9:
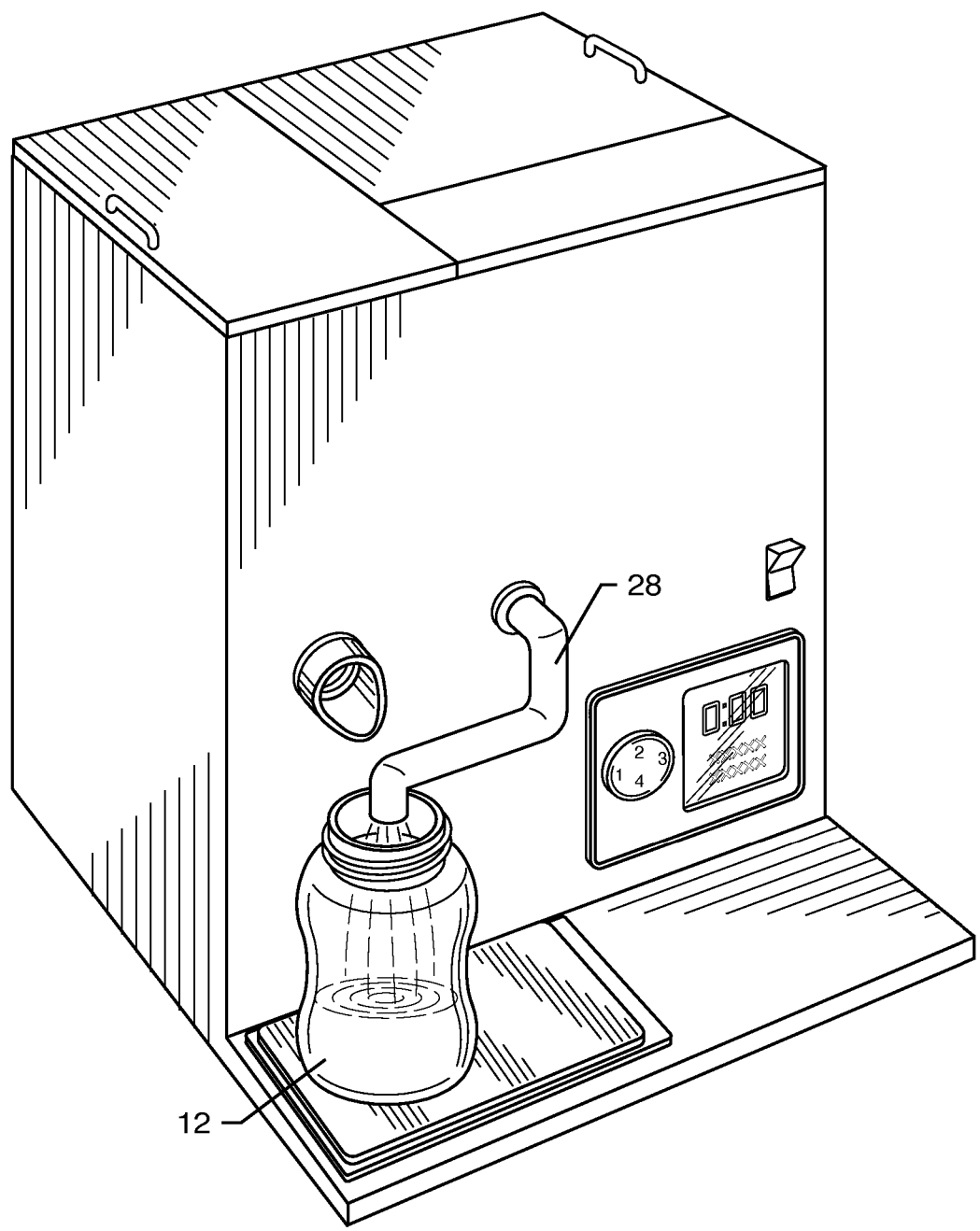
FIG. 9 is a perspective view of the baby formula preparation device of the present invention, illustrating dispensing water into the baby bottle.

After the user selects the type of formula (206) and the serving size (214), the device controller initiates the preparation process (216). The water dispenser 52 begins to gravity feed the water (218) from the water storage tank 38, through the conduit 46 and into the water heater 50. Alternatively, the water dispenser 52 may utilize a pump (not shown) to pump the water from the water storage tank 38 and into the water heater 50. The water heater 50 heats the water (220) as the water flows therethrough. The heated water is dispensed into the baby bottle (222) after being discharged from the nozzle 28 via the water dispenser 52, as illustrated in FIG. 9. As shown in FIG. 6, the conduit 46 preferably introduces the water from the water storage tank 38 into the water heater 50 at an angle with respect to the inner wall of the water heater 50 to create a swirling vortex of water therein until the water exits through the second conduit 54. The vortex increases the surface area contact of the water within the water heater 50. Additionally, a series of heating coils 70 are disposed longitudinally within the water heater 50 to further increase the surface area of the heating element in contact with the water. As shown in FIG. 7, the water input into the water heater 50 from the conduit 46 must follow a generally horizontal path through the series of heating coils 70 before being discharged to the water dispenser 52 via the second conduit 54. The heating coils 70 directly contact the water as the water passes through the water heater 50. The water heater 50 and corresponding heating coils 70 preferably comprise a metal or other highly conductive material to maximize heat transfer to the water. The water heater 50 preferably warms the water to approximately body temperature to maximize palatability to the baby. A temperature sensor (not shown), such as a bimetal thermostat or thermocouple wire, is attached to the water heater 50 and senses the temperature of the water. The controller monitors these temperature readings and regulates the power to the heating coils 70. The controller changes the power supplied to the heating coils 70 to maintain a water temperature of approximately 98.7 degrees Farenheight.

Alternatively, the heater switch 30 (FIG. 1) enables the user to turn off the water heater 50 in the event the user does not want to preheat the water before dispensing into the baby bottle 12. Dispensed water would be room temperature.

The advantage of using the water heater 50 and corresponding heating coils 70 is that the water is heated to a specific temperature during the process of making the liquid baby formula. Therefore, a large reservoir of preheated water is not required. Although, the heated reservoir of U.S. Publication No. 2005/0230343, the contents of which are herein incorporated by reference, may also be used with the present invention. Users may make multiple servings of liquid baby formula without preheating the water in the water storage tank 38. The water heater 50 is preferably smaller in volume than the water storage tank 38 to facilitate efficient heating of the water therein. This allows the baby formula preparation device 10 to quickly heat water as needed. Having the ability to make multiple servings instantly is particularly useful for twins or toddlers that drink relatively larger quantities of liquid baby formula per feeding.

Dispensing the water into the baby bottle (222) occurs via the nozzle 28. The controller activates rotation of an actuator 71 that positions the nozzle 28 from a non-pour position to a pour position (FIG. 5) to dispense the heated water into the baby bottle (222). Maintaining the nozzle 28 in a non-pour position (FIG. 4) ensures that excess liquid does not inadvertently exit the nozzle 28 during non-use or a non-water dispensing step of the present invention. Alternatively, the nozzle 28 may be stationary and constantly maintained in the pour position shown in FIG. 1. The nozzle 28 may also be removable from the baby formula preparation device 10 for cleaning, if necessary. The nozzle 28 should comprise metal or a plastic compound that is not largely affected by temperature change. The nozzle 28 may comprise a temperature sensitive plastic compound that changes color when the heated water flowing therethrough exceeds a permissible water temperature. Of course, the controller could provide a visual or audible alarm, or even shut-off the baby formula preparation device 10 for safety purposes when the water temperature exceeds preprogrammed limits.

In a particularly preferred embodiment, the water storage tank 38 includes a low water indicator (not shown). The low water indicator could comprise a mechanical mechanism (e.g. a floating ball) or another electrical mechanism coupled to a lense that indicates (e.g. changes from green to red) when the water level falls below a low point. Alternatively, the low water level indicator could be electronic and comprise a sensor that activates a flashing light or audible alarm when the water level is low.

The load cell 24 measures the weight of the water dispensed into the baby bottle 12 during the step of dispensing heated water into the baby bottle (222). Once the required weight of water dispenses into the baby bottle 12, based on the type of powdered baby formula and selected serving size, the controller sends a signal to the water dispenser 52 to stop dispensing water (224). The water dispenser 52 may regulate water flow with a solenoid valve. The water dispenser 52 accordingly shuts off and rotates the nozzle 28 to the non-pour position shown in FIG. 4. Next, the controller initiates the auger (226) for pouring powdered baby formula into the baby bottle (228) from the powdered baby formula hopper 36.

The powdered baby formula hopper 36 is designed to solve a common problem encountered with many existing powdered baby formula mixing devices. The dry powdered baby formula tends to settle at the bottom of powder hoppers and becomes difficult to dispense in an appropriate and consistent amount. Many prior art mixing devices utilize complicated and expensive agitating or mixing mechanisms prone to breakage. Moreover, agitating or shaking powder can further aggravate the settling and even cause packing of the powdered baby formula areas unreachable by the dispensing mechanism. Therefore, the present invention implements a dispensing mechanism in the form of the improved rotatable auger 44. The auger 44 is preferably a somewhat flexible coil spring or other helical coil as illustrated in the partially-sectioned view of the powdered baby formula hopper 36 in FIG. 8. A drive motor 72 is electrically coupled to and regulated by the controller. The drive motor 72 has a gear head 74 that interconnects with a drive receptor (not shown) in a rear portion 76 of the cylinder 42. The auger 44 is mechanically coupled to the drive receptor. The controller sends an electronic signal to the drive motor 72 to initiate rotation of the gear head 74. The gear head 74 in turn rotates the drive receptor and the coupled auger 44. As shown in FIG. 8, the auger 44 is positioned in a lower portion of the cylinder 42. The auger 44 conforms to the circular portion of the cylinder 42, substantially extending to the exterior walls thereof. The auger 44 extends approximately the diameter of the cylinder 42 to ensure all the powdered baby formula is dispensed from the hopper 36. The auger 44 pushes the baby formula to the spout 26 positioned immediately above the baby bottle 12 as shown in FIG. 10. The controller stops pouring powdered baby formula into the baby bottle (230) when the predetermined weight of powdered baby formula is measured by the load cell 24. The user then removes the baby bottle (232) from the load cell, caps the baby bottle (234) with a cover 78 (FIG. 1) and shakes the baby bottle (236) to adequately mix the water and powdered baby formula mixture. Thereafter, the mixture is ready for serving to a baby (236).

The baby formula preparation device 10 may include additional lights, control panels and switches as necessary to carry out the operations described above. Such additional equipment may also convey power status, water temperature readings or an automatic system shutoff mechanism. The housing 14 could also be designed to carry nipples, rings, bottles, plastic bags, or other baby formula preparation materials in a side compartment thereof. Moreover, the baby formula preparation device 10 may be powered by an electrical connection to a wall socket or via a battery to enable portability.

Although several embodiments have been described in detail for purposes of illustration, various modifications may be made without departing from the scope and spirit of the invention. Accordingly, the invention is not to be limited, except as by the appended claims.

What is claimed is:

1. A baby formula preparation device, comprising:
   a powder hopper removably connected to the device, said hopper having an upper trough and a lower cylinder configured such that walls of the upper trough are aligned with walls of the lower cylinder;
   a distributor operably associated with the hopper for loading variable amounts of powdered baby formula from the hopper into a bottle, wherein the distributor includes a motor-driven auger located inside the lower cylinder of the hopper;
   a system for dispensing heated water into the bottle, including a water storage tank removably connected to the device, a water heater, a temperature sensor for determining the water temperature exiting the baby formula preparation device through the water heater, and a pump for pumping water from the storage tank through the water heater;
   a load cell for measuring the weight of the bottle; and
   a controller coupled to the load cell for regulating the quantity of powdered baby formula and heated water respectively loaded and dispensed into the bottle based upon sensed measurements from the load cell, wherein the controller includes information regarding the quantity by weight of powdered baby formula and heated water required for preparing a serving of baby formula.

2. The baby formula preparation device of claim 1, including a switch for proportionally changing the number of servings dispensed into the baby bottle.

3. The baby formula preparation device of claim 1, including means for regulating the heated water temperature based on temperature sensor readings of the water exiting the water heater.

4. The baby formula preparation device of claim 3, wherein the heated water is heated to approximately body temperature.

5. The baby formula preparation device of claim 1, wherein the bottle has a predetermined tare weight.

6. The baby formula preparation device of claim 1, further comprising a remote transmitter for activating the controller by a radio frequency or infrared transmitter.

7. A baby formula preparation device, comprising:
   a powder hopper removably connected to the device;
   a distributor operably associated with the hopper for loading powdered baby formula from the hopper into a bottle, wherein the distributor includes a motor-driven auger and a water system includes a pump for pumping water from a water storage tank, through a water heater and out a nozzle;
   a system for dispensing heated water into the bottle, including the water storage tank removably connected to the device and the water heater, wherein the heated water is heated to approximately body temperature;
   a load cell for measuring the weight of the bottle;
   a controller coupled to the load cell for regulating the quantity of powdered baby formula and heated water respectively loaded and dispensed into the bottle based upon sensed measurements from the load cell, wherein the controller includes information regarding the quantity by weight of powdered baby formula and heated water required for preparing a serving of baby formula;
   a switch for proportionally changing the number of servings dispensed into the baby bottle; and
   a remote transmitter for activating the device by a radio frequency or infrared transmitter.

\* \* \* \* \*